Patented Mar. 2, 1954

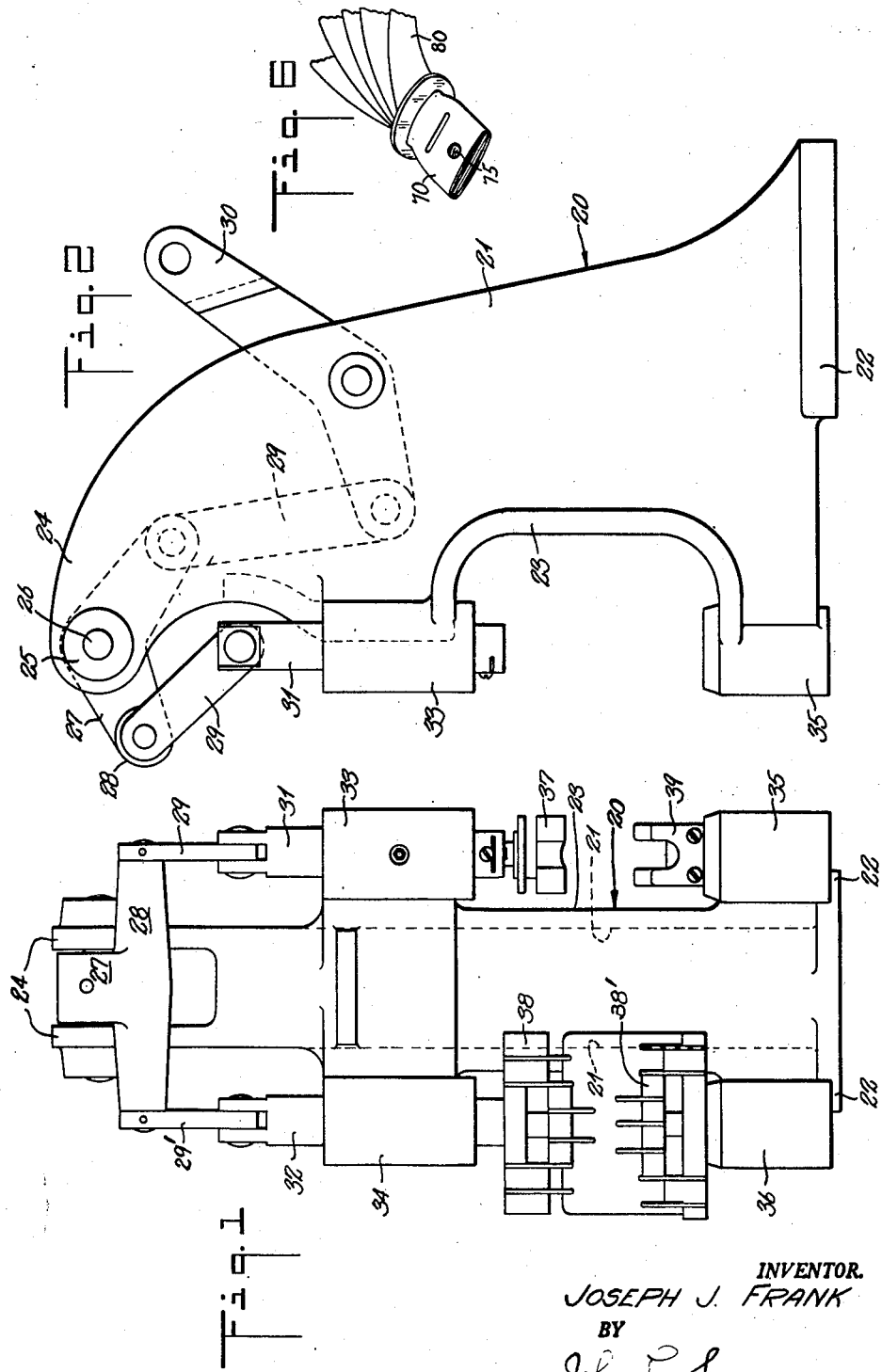

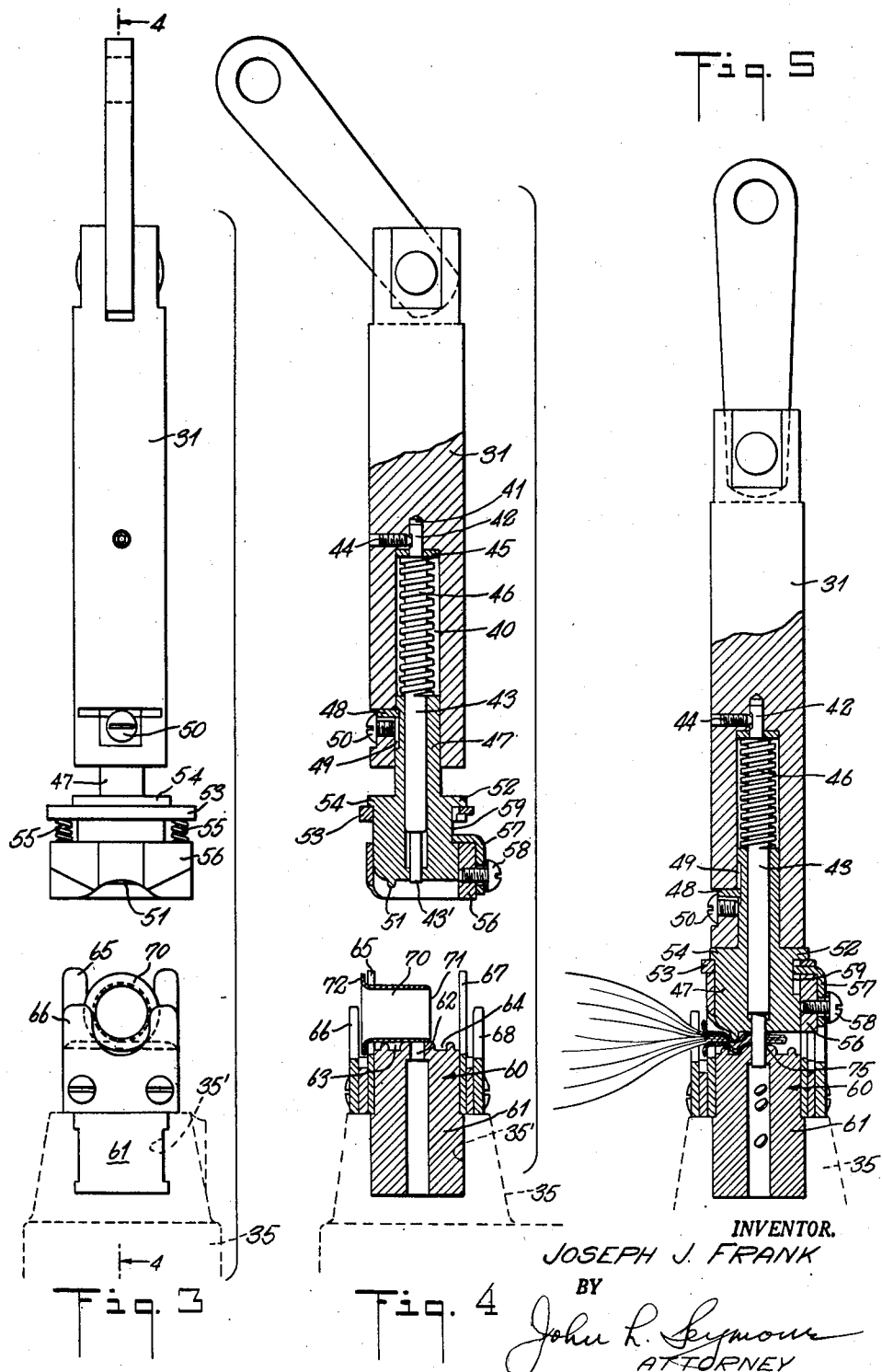

2,670,524

UNITED STATES PATENT OFFICE 2,670,524

MACHINE FOR APPLYING BARREL FASTENERS TO SAUSAGE CASINGS

Joseph James Frank, Union, N. J.

Original application December 2, 1947, Serial No. 789,158. Divided and this application September 22, 1948, Serial No. 50,587

6 Claims. (Cl. 29—33)

This invention relates to sausages, to sausage casing, to means of sealing the ends of sausage casings, and to means for sealing the ends of flexible tubes in general.

This invention deals primarily with a major problem of the sausage industry. The meat packing industry in this and in foreign countries produces every month millions of large sausages, of which Bologna and wurst are representative as to size. These sausages weigh from a fraction of a pound to 18 lbs. or more. Some of them are prepared in natural casing, but the majority of them are put up in artificial casing of regenerated cellulose. This is particularly true of the larger sizes, because such casing is necessary to sustain the weight on account of the small strength of natural casing. In the manufacture of the sausage, the casing is sealed at one end, filled with the sausage meat through a stuffing horn, sealed at the other end, cooked in hot water, and suspended in the smoke house. The customary method of suspending them is by means of string, although metal means for suspension have been proposed. Such a metal clip includes a flat plate having a hole at one end to receive the suspending nail in the smoke house and a pair of metal wings or clips that can be bent around the "neck" of the sausage. In any case, whether by string or metal member, the suspension is from one side of the "neck" of the sausage. It is the universal experience of all meat packers that great loss is occasioned in the smoke house by the failure of the casing during suspension. The casing gives way and the sausage is a total loss. This loss runs into the millions of dollars every year and is one of the severest problems that face the sausage packing industry.

There is an objection to the suspension of sausage by string, in addition to that arising from the collapse of the casing, that comes from the unsanitary appearance of the suspending string. It would be desirable to suspend the sausage solely by metallic means if possible so that the exterior of the sausage could be kept in a strictly sterile condition.

In order to avoid the loss occasioned by attempts to suspend sausages by the casing, it is the practice to cover the sausage with a stocking and to suspend the stocking with the sausage in it. The use of a stocking adds to the cost of the sausage the time and labor necessary to apply the stocking and the cost of the stocking itself. The appearance of the sausage is not improved by the stocking, which is of loose mesh and tends to pick up dirt from any object it touches.

It is an object of this invention to reduce the loss of sausage by casing failure.

It is an object of the invention to prepare a unitary sealing and suspending means for sausage casings from which the sausage may be suspended with uniform stress applied to all parts of the casing.

Another object of the invention is to construct a machine for applying sealing and suspending means to the end of a flexible tubular body or container.

Another object of the invention is to construct a machine for employment in meat packing plants in the sealing of sausage casing.

Further objects of the invention are concerned with the novel details of construction disclosed in the specification and drawings.

The objects of the invention are accomplished, generally speaking, by collapsing the end of the casing tube, pleating it, crimping a metal circlet upon the pleat, and punching a hole through the metal and the pleat in such a position that the sausage casing is firmly sealed between the punched hole and the meat. In the preferred form of practicing the invention, a flanged metal eyelet is crimped upon the pleated end of the sausage casing and a hole is punched through the eyelet and the pleat near the outer end. This sausage may be suspended from a suitable metal suspending means such as the novel hook herein described, and it is found that the loss of sausage by breaking of the casing is very greatly reduced.

Heretofore, the suspension of sausage had, in every case, been from one side of the neck. This appeared to be harmless because of the small distance between the axis of the sausage and the point of suspension, but it is my discovery that this places an additional strain upon one part of the sausage that is sufficient to weaken it in the smoke house until it breaks. In my invention, the point of suspension is located on the axis of the sausage, so that a cone with its apex at the point of suspension would have its side tangent to the round filled end of the sausage. When this sausage is suspended by means such as the novel hook herein described, all portions of the casing are subjected to identical strain and rupture of casings is vastly reduced.

The accompanying drawings show means for carrying the invention into effect and the invention will be described in detail in connection with the figures thereof.

In the drawings, wherein like reference characters refer to like parts throughout the several views, Fig. 1 is an elevational front view of a machine constructed according to the principles of the invention.

Fig. 2 is an elevational side view of the machine shown in Fig. 1.

Fig. 3 is an enlarged elevation of the crimping punch-plunger of the new machine.

Fig. 4 is a side view mainly in longitudinal section on the line 4—4 of Fig. 3, with the plunger in up position.

Fig. 5 is a similar section with the plunger in operating position.

Fig. 6 is a perspective view of a sausage casing with the sealing hanger in position.

The working part of the machine frame is indicated by numeral 20 and is composed of a pair of metal webs 21 having flanges 22 on both sides and connecting web 23 along its front edge. The connecting web is omitted at its upper part and the webs 21 become a fork 24 in which are mounted the bearings 25 for pintle 26. Mounted for rocking movement upon pintle 26 is rocker arm or lever 27 which is extended sidewards to form beam 28 at one end, and at the other end is pivotally attached to a link 29 through which power and rocking motion is transmitted from power lever 30. The beam 28 is attached by links 29 and 29' to two plungers 31—32 that are mounted for vertical reciprocating motions in long bearings 33—34 formed as extensions of the frame 20.

The lower part of the frame extends outward in two blocks 35—36 that are or form seats for appropriate tools. The blocks are aligned with the respective plungers. Block 36 and plunger 32 carry cooperating parts 38—38' of a pleater, the structural details of which appear in a copending application Serial No. 736,240, filed March 21, 1947, now U. S. Patent S. N. 2,589,792. The block and plunger 35—31 carry cooperating parts of a crimper punch 37—39 of novel construction, the particular details of which are shown in Figs. 3, 4, and 5. The upper and lower members 47 and 60 constitute cooperating crimping and punching dies.

In Figs. 3, 4, and 5 the plunger 31 is shown as provided with a recess 40 which has a reduced extension 41 into which projects a pin 42 on the end of a punch 43. Pin 42 is held in position by a screw 44; a washer 45 takes the thrust of a spring 46 which bears against the upper end of a crimping head 47 which is slidably mounted about the shank of the punch 43 and is permitted a limited motion therealong by the limiting block 48, which is held in a slot 49 by the edge of a screw 50 threaded into the lower end of plunger 31. The crimping head 52 is provided with a land 51 extending across it at one side of the working end 43' of punch 43. A bearing plate or ring 53 is thrust against a flange 54 by springs 55 which bear upon the top of a stripper guide 56 that encompasses the lower end of the crimping head 52 and is mounted for vertical sliding motion thereon. At the back of the crimping head an L-plate 57 is mounted by a screw 58 and extends into a slot 59 which serves to limit the motion of the stripper guide 56 and to prevent the springs 55 from ejecting it from the machine.

In cooperation with the said structure is the block 35 which has an upwardly opening recess 35' in which is seated the cooperating part 60 of the crimping and punching mechanism. This has a block 61 with a punch die 62 aligned with the end 43' of punch 43. Oppositely disposed with respect to the punch die are grooves 63, 64 either of which may be aligned beneath the land 51 by rotating the member 61 within the support 35. The block 60 has mounted at opposite sides thereof two sets of guides 65—66 and 67—68. The inner guides receive the barrel of a barrel fastener 70 and space it laterally upon the block 69 with its inner end 71 projecting beyond the punch opening 62 and another portion disposed above the slot 63. The guide 66 is so spaced from the guide 65 that it receives the flange 72 of the barrel fastener 70 and thus insures the proper positioning of the fastener between the crimping and clamping elements. The other pair of similar guides 67—68 are of different size so that different types of barrel fastener may be employed. Furthermore, the guides 65—66 may themselves differ from each other so that they may receive barrel fasteners of different length and width, the flange of one type going outside the guide 66 and the flange of another type going inside as shown in Fig. 4. The guide 66 normally assists as shown in Fig. 5 to position the treated end of a flexible tube correctly within the barrel before the crimping operation proceeds. The guides 65, 66 and 67, 68 have opposed parts forming abutments which limit the sidewise motion of the fastener and position it correctly between the dies for sealing.

In fastening the end of a flexible tube such as a sausage casing with this machine, the rocker lever 27 is in raised position as shown in Fig. 1, a flexible tube is collapsed and the end is put between the pleating elements 38—40. Power is applied through the lever and the plunger 32 descends, pleating the end of the tube. The pleat is thrust into a barrel fastener 70 and the fastener is lodged in the guide 65—66 as shown in Figs. 3 and 4. The plunger 31 is now depressed and, as shown in Fig. 5, collapses the barrel fastened upon the end of the sausage casing and crimps it there. Then as the punching stroke of the plunger continues the punch 43 penetrates the end of the barrel fastener and the enclosed pleat. This not only makes an aperture in the end of the fastener, but causes the fastener to grip the end of the casing more strongly. The stripper guide 56 extends over the barrel of the fastener and prevents it from being moved out of position during the crimping and punching operation. It is displaced out of the way as the crimping elements come together so that it does not interfere with the lateral expansion of the collapsing barrel of the fastener. As the plunger is lifted on the retracting stroke, the spring 46 bears upon the end of the crimping head and thrusts it against the crimped and punched fastener, freeing the punch from the grip of the fastener. The edges of the fastener may in some circumstances project under the side edges of the stripper guide 57 and if so, that guide under the thrust of the springs 55 ejects the fastener finally from the machine.

The appearance of a sealed tube is somewhat as shown in Fig. 6 wherein the fastener is indicated by the numeral 70 and the aperture by the numeral 75. When suspended from the hole 75 the strain imposed by the weight of the sausage on the casing is evenly divided on all parts of the casing. It is believed that this is the first time that this has been accomplished and that all prior constructions impose a greater strain upon one side of the neck of the sausage than on the other when direct hanging is attempted.

This invention serves the meat packing industry by saving the cost of sausage stockings for all sausages of substantial weight. It permits direct suspension in the smoke room. It eliminates the unsanitary character of the stocking. It prevents the loss of vast quantities of meat which heretofore has occurred by the rupture of casing under the weight of the sausage when suspended both in the smoke house and in the store.

This is a division of application Serial No. 789,158, now abandoned.

As many apparently widely different embodiments of the present invention may be made without departing from the spirit and scope thereof, it is to be understood that the invention is not limited to the specific embodiments.

What is claimed is:

1. A machine for sealing flexible casing including a punch block and plunger with cooperating punching parts and with cooperating crimping parts beside the punching parts, said block including oppositely disposed guides having laterally and longitudinally spaced guide parts for positioning a flanged barrel fastener upon the block, said plunger having a recess, a punch part mounted in and extending from the recess, a crimping head slidably mounted upon said punch part, a spring within the recess bearing upon the said head, and a spring pressed stripper guide surrounding said head, displaceable therealong and extending beyond the end of the punch part in one position.

2. A machine for sealing flexible casing including a punch block and plunger with cooperating punch parts and with cooperating crimping parts beside the punch parts, said plunger having a recess, a punch part extending from the recess, a crimping head slidably mounted upon said punch part, a spring within the recess bearing upon the said head, and a spring pressed stripper guide surrounding said head depressible therealong and in one position extending beyond the end of the punch part.

3. Apparatus for sealing flexible closures by means of flanged barrel fasteners that comprises a punch block having a working face penetrated by a punch hole and crimping grooves on opposite sides of the punch hole, guides on opposite sides of the block having parts spaced from the block by a slot for the flange of a barrel fastener, said guides having opposed parts for centering the barrel of the fastener upon the block in position overlying a crimping groove and the punch hole, cooperating punch means having a punch pin aligned with said hole, a crimping head slidably mounted on the said pin, spring means biasing the said crimping head toward said punch block, said crimping head having a working face opposed to said working face provided with a rib capable of alignment with a said groove, mounting means for the punch block permitting the reversal of the position thereof, sleeve means mounted slidably on said crimping head having oppositely disposed parts extending below the said rib of said crimping head during periods of idleness and slidable thereabove during crimping, and means to bring said faces into crimping relation.

4. Apparatus for sealing flexible closures by means of flanged barrel fasteners that comprises a crimping block having a working face comprising punch means and crimping grooves on opposite sides of the punch means, guides on opposite sides of the block having parts spaced from the block by a slot for the flange of a barrel fastener, said guides having opposed parts for centering the center of the barrel upon the block in position overlying a crimping groove and the said punch means, a spring pressed crimping head aligned with said crimping block, punch means associated therewith, said head being movable with respect to its associated punch means, said crimping head having a working face opposed to said working face and provided with a rib capable of alignment with a said groove, mounting means for said block permitting the rotation thereof, sleeve means mounted slidably on a said block having parts extending beyond the said working face of said head during periods of idleness and slidable thereabove during crimping, and means to bring the said faces into crimping relation.

5. Apparatus for sealing flexible closures by means of flanged barrel fasteners that comprises a crimping block having a working face comprising punch means and crimping grooves on opposite sides of the punch means, guides on opposite sides of the block having parts spaced from the block by a slot for the flange of a barrel fastener, said guides having opposed parts for centering the center of the barrel upon the block in position overlying the punch means and a crimping groove, punch means and a spring pressed crimping head aligned with said block and its punch means, said head being movable with respect to its associated punch means, said crimping head having a working face opposed to said working face and provided with a rib capable of alignment with a said groove, mounting means for said block permitting the rotation thereof, and means to bring the said faces into crimping relation.

6. A machine for sealing barrel fasteners on flexible casings comprising cooperating barrel collapsing and punching means including a die block provided with a punch part and a cooperating die block having a cooperating punch part, said blocks carrying cooperating crimping means and fastener guide means beside the punch parts for holding and crimping a said fastener as it is applied and punched, a second crimping means and fastener guide means on one of said blocks, said last named block being reversible to bring said second crimping means into alignment with the crimping means on the other block.

JOSEPH JAMES FRANK.

References Cited in the file of this patent

UNITED STATES PATENTS

| Number | Name | Date |
| --- | --- | --- |
| Re. 16,897 | Allatt | Mar. 13, 1928 |
| 432,108 | Anderson | July 15, 1890 |
| 772,619 | Kerngood | Oct. 18, 1904 |
| 1,158,864 | Schmidt | Nov. 2, 1915 |
| 1,289,178 | Howell | Dec. 31, 1918 |
| 1,321,139 | McClenathen | Nov. 11, 1919 |
| 1,493,075 | Hirschhorn | May 6, 1924 |
| 1,792,790 | Wisti | Feb. 17, 1931 |
| 1,901,575 | Altvater | Mar. 14, 1933 |
| 1,920,303 | Grotnes | Aug. 1, 1933 |
| 2,076,436 | Nelson | Apr. 6, 1937 |
| 2,206,307 | Schneider | July 2, 1940 |
| 2,225,739 | Elliott | Dec. 24, 1940 |
| 2,295,852 | Le Jeune | Sept. 15, 1942 |
| 2,364,661 | Rode et al. | Dec. 12, 1944 |
| 2,395,083 | Wilson | Feb. 19, 1946 |
| 2,422,952 | Dakin | June 24, 1947 |
| 2,434,375 | Van Saun | Jan. 13, 1948 |